United States Patent [19]

Kiss

[11] 4,394,334
[45] Jul. 19, 1983

[54] PROCESS AND APPARATUS FOR DEBURRING MOULDED PARTS PRODUCED BY PRESSING

[75] Inventor: Gunter H. Kiss, Berlin, Fed. Rep. of Germany

[73] Assignee: Lignotock Verfahrenstechnik GmbH, Berlin, Fed. Rep. of Germany

[21] Appl. No.: 341,643

[22] Filed: Jan. 22, 1982

[30] Foreign Application Priority Data

Jan. 22, 1981 [DE] Fed. Rep. of Germany ....... 3102220

[51] Int. Cl.³ .............................................. B29J 5/06
[52] U.S. Cl. ....................................... 264/80; 264/25; 264/27; 264/161
[58] Field of Search ....................... 264/80, 25, 27, 161

[56] References Cited

U.S. PATENT DOCUMENTS 3,578,734  5/1971  Woodard et al. ..................... 264/80
3,702,789 11/1972  Dungan ................................ 264/80

Primary Examiner—Maurice J. Welsh
Attorney, Agent, or Firm—Basile, Weintraub & Hanlon

[57] ABSTRACT

A process and the apparatus for deburring moulded parts produced by pressing especially moulded parts of lignocellulose fibre mats. A small circumferential zone of the fibre mat between the edge contour of the moulded part to be deburred and the edge of the waste shoulder is thermally decomposed during pressing. The thermally decomposed material portion of the fibre mat is removed from the edge contour of the moulded part while taking off the moulded part from the press tools. The decomposition zone is limited by a circumferential groove shaped chamber provided in one of the press tools. The portion of the fibre mat enclosed in the chamber is practically uncompressed and the chamber is provided with different methods for the thermal decomposition. The decomposition methods cause a carbonization of the material in the decomposition zone which facilitates the removing of the waste shoulder from the moulded part so that an additional treatment by hand is unnecessary.

12 Claims, 1 Drawing Figure

PROCESS AND APPARATUS FOR DEBURRING MOULDED PARTS PRODUCED BY PRESSING

BACKGROUND OF THE INVENTION

1. Field of the Invention

This invention relates to a process for deburring moulded parts produced by pressing, especially large edge contours of poorly heat-conducting materials, such as crushed, glued organic raw- or secondary raw materials, for example, which are used to form compressed lignocellulose fibre mats.

2. Description of the Prior Art

Panels, parts of furniture, transport pallets and the internal linings of motor vehicle interiors are produced of fibre mats generally by hot-compressing a voluminous loosly binded fibre mat with press tools giving a three-dimensional self supporting moulded part.

During pressing the edge contour of the moulded part is formed mainly by squeezing or dipping edges thereby producing an outer circumferential waste shoulder which has to be cut off after the finished moulded part is removed from the press tools. Due to the tolerance of the tools and especially due to the wear of the tools caused by producing a larger quantity, a press burr will remain on the finished moulded part after the waste shoulder is cut off which has to be removed during additional working steps. The moulded parts are of voluminous size and;. Therefore the deburring of the press burr was previously made by hand because an automatic deburring cannot be realized by reason of the relatively large moulded parts and their three dimensional shaped, intricate contours. This deburring by hand leads to high production costs, particularly, because the moulded parts themselves are to a large extent manufactured automatically. Hence, it is desirable to reduce the costs attendant the deburring in a way which corresponds to the automatic manufacture of the moulded parts.

Automatic deburring processes are known, such as drum deburring, chemical deburring and thermal deburring, which are used for smaller moulded parts of metallic materials. Dut to the large size of the moulded parts under discussion and their material structure these known deburring processes cannot be used. The moulded parts produced of fibre mats have such a size that it is not possible to place them in a deburring drum. Chemical deburring processes are not applicable due to the liquid receptivity of the fibre materials used to form the discussed moulded parts. The thermal deburring usually used for metallic moulded parts can in particular not be used for pressed organic materials for several reasons. The moulded parts produced of fibre mats are of such size that a suitable apparatus is not available. During thermal deburring in the deburring chamber, pressures of more than 100 bar occur so that the manufacture of apparatus of suitable size is extremely expensive and requires a larger amount of construction work. Moreover, the poor heat-conduction of organic materials prevents the burr from being over-heated with respect to the body of the finished moulded part, as is necessary for the thermal deburring so that the total surface of moulded parts formed of such organic materials are attacked during thermal deburring. This leads to partial cabonization and to formation of cracks, especially, if the wall thickness of the moulded parts is small. The moulded parts thus become useless.

The intent of the invention is to improve the known thermal deburring such that the finished moulded part after pressing can be removed without burrs from the press tools so that the reworking with excessive labor cost hitherto required becomes superfluous.

SUMMARY OF THE INVENTION

The inventive thermal decomposition of a small zone of material along the edge of the contour of the finished moulded part inside of the press tool during pressing offers many advantages. The finished moulded part is enclosed during thermal decomposition by the press tools, so that the total surface is protected and no damage occurs thereto. Due to the small material portion which is thermically decomposed in the decomposition zone, the energy consumption for the thermal decomposition which can take place as combustion is small. Additionally the moulded parts generally are hot pressed so that the decomposition zone is preheated. This fact further lowers the energy consumption. Moreover the decomposition takes place at the same time as the pressing, hence, the production requirements and costs are reduced.

It is advantageous that the material in the decomposition zone between the waste shoulder and the edge contour of the finished moulded part be practically not compressed. The porous structure of the uncompressed material favors the thermal decomposition and accelerates the process because heat conduction inside of the material is still more reduced and because the uncompressed material has enlarged surfaces and therefore enlarged working surfaces subjected to decomposition and/or combustion.

If the heat necessary for the thermal decomposition is conducted through heat leading surfaces to the material of the decomposition zone it is possible to limit the thermal decomposition reliably to the decomposition zone so that the decomposition cannot encroach uncontrollably on the finished moulded part.

The thermal decomposition can be accomplished by electrical resistance heating using a discardable heating wire or a heated sintered material. The decomposition can also be accomplished by high frequency heating. The heating wire can be taken away with the decomposed material and for the thermal decomposition of the next moulded part can be replaced by a new one. The temperature during thermal decomposition is higher than the decomposition temperature of the respective material. If the thermal decomposition is carried out without oxygen, after opening the mould, the finished moulded part has a carbonized material portion at its edge contour which can be removed easily due to its slight mechanical strength so that the required costs for the deburring are low. It is advantageous to carry out the thermal decomposition together with a combustion so that a complete deburring is obtained. To achieve this a combustible gas mixture with an oxygen surplus is ignited, the ignition yields the necessary decomposition energy and the oxygen surplus afterburns the decomposition product, so that the previously required additional deburring is superfluous.

Similar favourable conditions are obtained when the material decomposition is carried out in an oxygen atmosphere by heating up to ignition temperature the material portion to be decomposed at one or several spots. When initiating the decomposition at several spots the decomposition and burning time is reduced. Moreover the finished moulded part is attacked more uniformly at the whole circumference so that a better and more uniform deburring, especially for large moulded parts, is possible. It is essential for the process of the present invention that the thermal decomposition or the after-burning of the decomposition products is finished before the moulded parts are removed from the press tools to avoid an endangering of the products due to after-glowing and fire risk. Hence the thermal decomposition and/or the associated after-burning is finished by introducing an inert gas and/or a liquid into the decomposition zone. The inert gas or the liquid eliminates the oxygen supply and an additional cooling of the decomposition zone is obtained. Nitrogen is used as inert gas and preferably water is used as the liquid. The water evaporates in a sudden burst when contacting the heated press tools, so that the oxygen in the decomposition zone is displaced temporarily with high excess pressure. At the same time, the corresponding tool and material area is cooled by the heat of evaporation of the water.

The apparatus performing the process of the present invention typically comprises an upper and a lower press tool. The edge area of the moulded part is shaped in the upper press tool. A circumferential chamber is provided in the lower press tool forming the decomposition zone which slightly overlaps the edge of the moulded part. A dipping edge shaped at the bottom surface of the edge of the moulded part protrudes into the chamber and is connected with the therein enclosed uncompressed material to be decomposed thermically. The chamber is covered by the upper press tool when the press tools are closed. The wall of the chamber opposite the dipping edge is constructed as a squeezing edge and serves as a heat conducting nose which seperates the material portion to be decomposed thermically in the chamber from the waste shoulder. The chamber is provided with means serving for the thermal decomposition. The volume of the chamber is larger than the volume of the uncompressed material portion of the fibre mat to be decomposed thermically enclosed in the chamber when the press tools are closed. The chamber can include a heating wire which contacts the fibre material and which causes the thermal decomposition. The chamber can also be provided with at least one supply lead for the combustible gas mixture and/or for oxygen and with a spark plug or the like for igniting the mixture or the oxygen. The thermal decomposition is carried out by burning the material of the fibre mat enclosed in the chamber by means of the combustible gas mixture and/or the oxygen. Advantageously the chamber is provided with a lead for introducing a medium to finish the decomposition process.

During thermal decomposition the uncompressed portion of the fibre mat enclosed by the chamber is carbonized or burned. During the removal of the moulded parts from the press tools, the thermically decomposed material portion is removed from the dipping edge at the bottom surface of the edge contour of the moulded part whereby the dipping edge has only slight irregularities which are not perceivable by an observer and which do not interfere with the application and the mounting of the moulded part so that a later deburring process is unnecessary.

DESCRIPTION OF THE PREFERRED EMBODIMENTS

Figure 1:
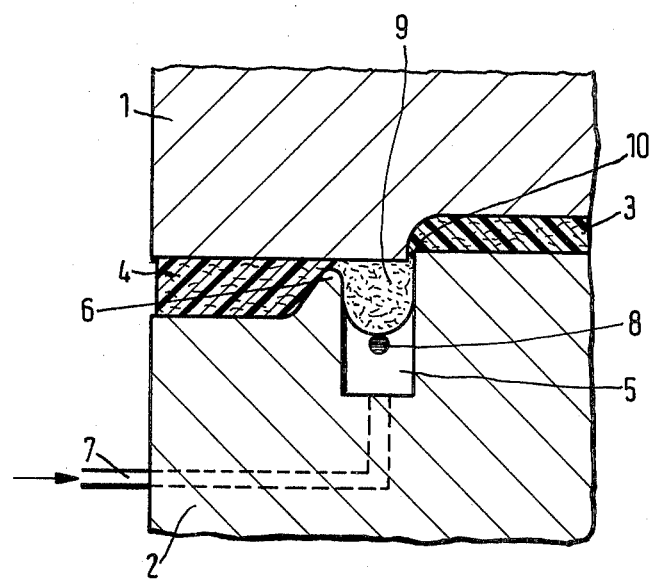

The apparatus includes an upper press tool 1 and a lower press tool 2. The edge contour 3 of the moulded part is shaped by the upper press tool 1 and has at the bottom surface of its boundary edge a dipping edge 10.

The lower press tool 2 has a groove shaped chamber 5 which with one wall is adjacent to the dipping edge 10. The wall of the chamber 5 opposite to the dipping edge 10 is constructed as a squeezing edge and serves as a heat conducting nose 6 which separates the uncompressed portion 9 of the fibre mat enclosed in the chamber 5 from the waste shoulder 4 shaped in the lower press tool 2. A heating wire 8 contacts the bottom surface of the uncompressed material portion 9 and, being heated up, causes the thermal decomposition of the material portion 9. The chamber 5 has a borehole connected to an oxygen supply lead 7.

The decomposition zone is reliably limited by the walls of the chamber 5 and by the upper press tool 1 with the press tools closed. Due to the lack of a surface sustaining pressure during pressing, a small practically uncompressed material portion 9 is formed in the chamber 5 which contacts the heating wire 8. The heating wire 8 can run self-supporting on ceramic supports, not shown, in the groove shaped chamber 5 and can be heated up electrically to a high temperature. The supply lead 7 introduces oxygen into the chamber 5. Advantageously the chamber 5 is provided with at least one discharge lead (not shown) which facilitates scavenging with oxygen. If oxygen is introduced into the chamber 5 when the press tools 1,2 are closed and the heating wire 8 is heated up to a respective high temperature, the uncompressed material portion 9 begins to thermically decompose and to burn. The oxygen can be supplied during a suitably long period especially if there are provided discharge paths for the combustion products. After the decomposition and the combustion of the material portion 9, the process is finished by introducing an inert gas or an extinguisher fluid instead of oxygen through the supply lead 7.

I claim:

1. A process for deburring moulded parts produced by pressing large edge contours of poor heat-conducting materials formed of crushed, glued, organic, raw materials comprising the steps of:
    thermically decomposing the material of a small circumferential zone between the edge contour of the moulded part to be deburred and the waste shoulder during pressing of the moulded part; and
    removing the decomposed material from the edge contour when the moulded part is removed from the press tools.

2. The process according to claim 1, characterized in that the material of the fibre mat in the decomposition zone is compressed less than the material of the moulded part and of the waste shoulder.

3. The process according to claims 1 or 2, characterized in that the heat necessary for the thermal decomposition is conducted through heat leading surfaces to the material of the decomposition zone.

4. The process according to one of the claims 1, 2 or 3, characterized in that the thermal decomposition is carried out by electrical resistance heating.

5. The process according to claims 1, 2 or 3, characterized in that the thermal decomposition is carried out by igniting a combustible gas mixture with a surplus of oxygen.

6. The process according to claims 1, 2 or 3, characterized in that the thermal decomposition is carried out in an oxygen atmosphere heating up to ignition temperature the material portion to be decomposed at one or more spots.

7. The process according to claims 1, 2, 3, 4, 5 or 6, characterized in that the thermal decomposition is finished by introducing inert gas and/or a liquid into the decomposition zone.

8. The process according to claim 1 further including the steps of:
   providing an upper and a lower press tool;
   forming a circumferential groove shaped chamber in the lower press tool;
   forming a dipped edge protruding from the bottom surface of the edge contour of the moulded part in the upper press tool adjacent to the circumferential groove shaped chamber in the lower press tool to limit the decomposition zone, the dipping edge being closed by the upper press tool;
   constructing the wall of the chamber opposite to the dipping edge as a squeezing edge which serves as a heat conducting nose; and
   providing the chamber with a thermal decomposition means.

9. The process according to claim 8 characterized in that the volume of the chamber is larger than the volume of the uncompressed portion of the fibre mat to be decomposed and closed by the chamber.

10. The process according to claims 8 or 9 characterized in that the chamber includes a heating wire contacting the fibre mat.

11. The process according to claims 8, 9 or 10 further including the step of:
    providing a supply lead for a combustible gas mixture and/or oxygen and an ignition for igniting the mixture and/or the oxygen.

12. The process of according to claims 8, 9, 10 or 11 further including the step of:
    providing a supply lead which serves to introduce a medium into the chamber for finishing the decomposition process.

* * * * *